United States Patent Office 3,094,463
Patented June 18, 1963

3,094,463
COMPOSITION CONSISTING OF 2-PYRROLIDYL-METHYL-N-LOWER ALKYL AND 3-PIPERIDYL-N-LOWER ALKYL PHENYLGLYCOLATES AS ANTI-SPASMODICS AND CENTRAL STIMULANT, AND PROCESS OF PREPARATION
John H. Biel, Milwaukee, Wis., assignor to Lakeside Laboratories, Inc., Milwaukee, Wis., a corporation of Delaware
No Drawing. Filed Mar. 27, 1962, Ser. No. 182,969
10 Claims. (Cl. 167—65)

This invention relates to the production of chemical compounds. More particularly, this invention is concerned with novel processes of producing chemical compositions having pharmacological action such as antispasmodic and central nervous system activity.

This application is a continuation-in-part of my copending application Serial No. 843,067, filed September 29, 1959, which is a continuation-in-part of my copending application Serial No. 321,745, filed November 20, 1952, which is a continuation-in-part of my then copending application Serial No. 217,413, filed March 24, 1951, all now abandoned.

It has been discovered according to one aspect of the present invention that an N-lower alkyl-3-halopiperidine can be reacted with a dicyclic glycolic acid under nonbasic conditions to form an N-lower alkyl or aralkyl-2-pyrrolidylmethyl dicyclic glycolate. This reaction can be represented as follows:

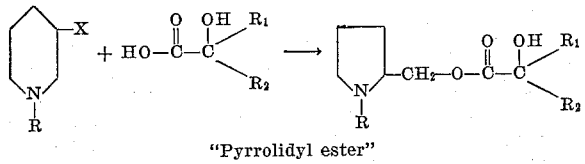

"Pyrrolidyl ester"

wherein X is a reactive halogen and particularly chlorine, bromine or iodine, R is a lower alkyl group or a phenyl-lower alkyl group such as the benzyl or phenethyl group, and $R_1$ and $R_2$ are cyclic groups such as phenyl, cyclopentyl, cyclohexyl and 2-thienyl, and groups in which

represent the xanthenyl and fluorenyl groups.

It is surprising that a ring contraction takes place with an acidic reagent such as the substituted glycolic acids because the prior art only shows ring contraction with basic reagents. Thus, a ring contraction with N-ethyl-3-chloropiperidine and amines is shown by Reitsema in J. Am. Chem. Soc. 71, 2041 (1949), and with other basic reagents by Paul et al. in Bull. Soc. Chim. 1958, 736. Furthermore, ring contraction with an acidic reagent was contraindicated by the prior art which teaches that N-ethyl-2-hydroxymethylpyrrolidine undergoes a ring expansion upon treatment with thionyl chloride and yields N-ethyl-3-chloropiperidine as shown by Fuson et al. in J. Am. Chem. Soc. 70, 2760 (1948), and with acetic anhydride to form N-ethyl-3-acetoxypiperidine as shown in Paul et al. supra.

Representative of the N-lower alkyl and aralkyl-3-halopiperidines which can be used in the process of this invention are N-methyl-3-chloropiperidine, N-propyl-3-bromopiperidine, N-butyl-3-chloropiperidine, N-benzyl-3-bromopiperidine and N-phenethyl-3-chloropiperidine.

Some of the dicyclic glycolates which can be used in the process are benzilic acid, phenyl cyclohexyl glycolic acid, phenyl cyclopentyl glycolic acid, phenyl 2-thienyl glycolic acid, di-cyclohexyl glycolic acid, di-cyclopentyl glycolic acid and 2-thienyl cyclohexyl glycolic acid.

The reaction is readily effected by intimately mixing the reactants in a suitable nonbasic inert liquid reaction medium such as dry isopropyl alcohol and heating the mixture at an elevated temperature such as at reflux. In general, care should be exercised to avoid excessively high temperatures, such as above about 100° C., since excessive heating causes rearrangement of the pyrrolidyl-methyl compound to the 3-piperidyl ester. The temperature at which this rearrangement takes place will obviously vary for the free base involved. Nevertheless, with care and the use of minimum reaction temperatures, no difficulty in effecting the reaction is experienced. Obviously, for the reaction to be effected at reflux a suitable solvent is employed with a boiling point low enough for reaction or reflux without also causing this rearrangement to any undesirable extent.

After the reaction is terminated, the reaction mixture is concentrated to dryness in vacuo, added to water, acidified and extracted with ether. Following neutralization of the aqueous solution it can be extracted with ether, the ether extracts dried and the ether removed by distillation to yield the N-lower alkyl or aralkyl-2-pyrrolidylmethyl dicyclic glycolate. The free base is not separated by distillation since the distillation temperatures required cause rearrangement of the pyrrolidyl ring to the piperidine group.

Acid addition salts of the tertiary bases are readily produced by contacting the free base with a suitable acid in the presence of a solvent such as acetone, benzene, ethanol, isopropanol or ether. Typical acids which can be used are hydrochloric acid, sulfuric acid, citric acid, tartaric acid, succinic acid and benzoic acid.

Onium salts are readily formed by contacting the free base with a lower alkylating agent in the presence of a suitable solvent such as anhydrous ether. The desired salt forms quickly and generally precipitates from solution. Lower alkylating agents such as methyl bromide, methyl chloride, methyl iodide, the corresponding ethyl halides, and dimethyl sulfate and diethyl sulfate are representative reactants that can be used to form onium salts thereof.

In addition to the formation of an N-lower alkyl or aralkyl-2-pyrrolidylmethyl dicyclic glycolate in the reaction there is also formed simultaneously significant amounts of an N-lower alkyl or aralkyl-3-piperidyl dicyclic glycolate of the formula

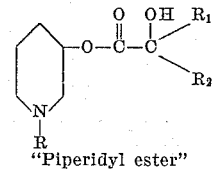

"Piperidyl ester"

wherein R, $R_1$ and $R_2$ have the significance previously assigned. Thus, in the reaction of N-ethyl-3-chloropiperidine with phenylcyclopentylglycolic acid from about 50 to 80% of the product is N-ethyl-2-pyrrolidylmethyl phenylcyclopentylglycolate and about 20 to 50% is N-ethyl-3-piperidyl phenylcyclopentylglycolate although usually the pyrrolidyl compound is 65–75%, and the piperidyl compound is 25–35%, of the product. The melting point of such mixtures is quite constant within the range of 185–192° C. and cannot be raised by recrystallization.

Similarly, upon reacting N-ethyl-3-chloropiperidine with benzilic acid there is formed N-ethyl-2-pyrrolidyl-methyl benzilate containing about 55% by weight of N-ethyl-3-piperidyl benzilate.

It is generally unnecessary to separate the products into the individual components because the mixtures have important utilities as such and because isolation is troublesome at best. Acid addition salts and quaternary ammonium salts of the compounds forming the mixtures are readily prepared as indicated above.

In the form of an acid addition or quaternary ammonium salt the compounds, separately or in mixtures as formed inherently in the described reaction, are useful as antispasmodic agents. The acid addition salts are also useful analeptic (central stimulating) agents.

The mixture of N-ethyl-2-pyrrolidylmethyl phenylcyclopentylglycolate hydrochloride (68% by weight) and N-ethyl-3-piperidyl phenylcyclopentylglycolate hydrochloride (32% by weight) is several times as potent an antispasmodic composition as atropine in the isolated guinea pig ileum. In addition, the composition possesses pronounced analeptic (central stimulating) activity in animals.

The following examples are presented to illustrate the process of this invention.

EXAMPLE 1

*The Reaction of Phenylcyclopentylglycolic Acid With N-Ethyl-3-Chloropiperidine*

A mixture consisting of 108.9 g. (0.50 mole) of phenylcyclopentylglycolic acid, 81.1 g. (0.55 mole) of N-ethyl-3-chloropiperidine and 625 cc. of isopropyl alcohol was refluxed for eighteen hours.

The solution was concentrated to dryness in vacuo with a steam bath. The residue was dissolved in 1000 cc. of water (pH 5) and extracted twice with 100 cc. of ether. The ether extracts were discarded.

The aqueous solution was neutralized and saturated with sodium bicarbonate. The oil was separated from the aqueous layer, which was extracted three times with 200 cc. of ether.

The combined ether extracts and oil was dried briefly over anhydrous magnesium sulfate. The ether and low boiling materials were distilled off using a steam bath and water aspirator.[1] The residue weighed 157 g. (95%).

The residue was dissolved in 750 cc. of acetone and acidified with ethereal hydrochloric acid to pH 2. The solid was filtered off, washed with acetone, and dried at 100° C. Yield—111.5 g. (60.7%), M.P. 179–181° C.

Ninety-one grams of the crude precipitate was recrystallized from 550 cc. of acetonitrile, the solution treated with charcoal, clarified by filtration and allowed to crystallize at room temperature.

Infrared analysis showed the product was 68% N-ethyl-2-pyrrolidylmethylphenylcyclopentylglycolate hydrochloride and 32% N-ethyl-3-piperidylphenylcyclopentylglycolate hydrochloride. The solid was isolated by filtration, M.P. 188–189° C., yield 52 g.

*Analysis.*—Calcd. for $C_{20}H_{30}ClNO_3$: Cl, 9.66; N, 3.81. Found: Cl, 9.65; N, 3.80.

EXAMPLE 2

*The Reaction of N-Ethyl-3-Chloropiperidine With Benzilic Acid*

A mixture containing 44 g. (0.30 mole) of N-ethyl-3-chloropiperidine and 68.4 g. (0.30 mole) of benzilic acid dissolved in 400 cc. of isopropyl alcohol was refluxed for 12 hours and then concentrated in vacuo to a yellow gum. The gummy residue was dissolved in water and the basic esters liberated by the addition of 55 g. of potassium carbonate. The aqueous, alkaline mixture was extracted with ether, the ether extracts dried with potassium carbonate and the ether removed by filtration. The residual oil was converted to the hydrochloride salt in isopropyl alcohol with ethereal hydrochloric acid, and the precipitate removed by filtration, yield 100 g. (89%), M.P. 153–155° C. Upon recrystallization from 500 cc. of isopropyl alcohol there was obtained 66 g. of insoluble precipi-

[1] Extreme care should be taken not to heat the free base beyond 100° C. since a conversion of the pyrrolidylmethyl to the 3-piperidyl compound occurs during heating of the free base above 100° C. Complete rearrangement takes place at 170° C.

tate which contained 45% of N-ethyl-2- pyrrolidylmethyl benzilate hydrochloride and 55% of N-ethyl-3-piperidyl benzilate hydrochloride (by infrared assay), M.P. 163–167° C. The mother liquor from the recrystallization was concentrated to dryness and the residue isolated, M.P. 145–147° C., yield 25 g. Infrared assay showed this to be pure N-ethyl-2-pyrrolidylmethyl benzilate hydrochloride.

The precipitate melting at 163–167° C. was recrystallized once from 150 cc. of ethanol and the insoluble material (15 g.) recrystallized again from 75 cc. of ethanol, yield 25 g., M.P. 191–192° C. Infrared assay showed this to be pure N-ethyl-3-piperidyl benzilate hydrochloride.

Various changes and modifications of the invention can be made and, to the extent that such variations incorporate the spirit of this invention, they are intended to be included within the scope of the appended claims.

What is claimed is:

1. A composition comprising a compound of the formula

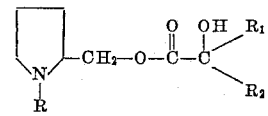

and a compound of the formula

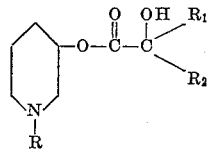

and each compound being present in an amount of at least 25% by weight of the total weight of the two compounds present, wherein R is a member of the group consisting of lower alkyl and phenyl-lower alkyl groups, and $R_1$ and $R_2$ are members of the group consisting of phenyl, 2-thienyl, cyclohexyl and cyclopentyl groups but $R_1$ and $R_2$ are not both phenyl at the same time.

2. A composition according to claim 1 in which the compounds are in the form of the same acid addition salt.

3. A composition comprising 65 to 75% by weight of N-ethyl - 2 - pyrrolidylmethyl phenylcyclopentylglycolate and 25 to 35% by weight of N-ethyl-3-piperidyl phenylcyclopentylglycolate.

4. A composition according to claim 3 in which the compounds are in the form of the same acid addition salt.

5. A composition comprising 65% to 75% by weight of N-ethyl - 2 - pyrrolidylmethyl phenylcyclopentylglycolate hydrochloride and 25% to 35% by weight of N-ethyl-3-piperidyl phenylcyclopentylglycolate hydrochloride having a melting point of about 185–192° C.

6. The process which comprises reacting a compound of the formula

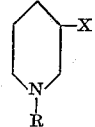

with a compound of the formula

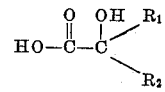

under acidic reaction conditions to simultaneously produce a mixture of compounds of the formulas

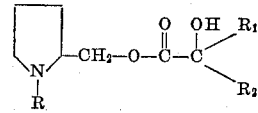

and

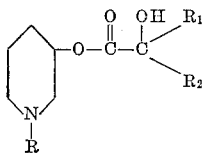

wherein R is a member of the group consisting of lower alkyl and phenyl-lower alkyl groups, and $R_1$ and $R_2$ are members of the group consisting of phenyl, 2-thienyl, cyclohexyl and cyclopentyl groups, and X is a reactive halogen.

7. The process which comprises reacting an N-lower alkyl-3-halopiperidine with phenylcyclopentylglycolic acid under acidic reaction conditions to simultaneously form a mixture of N-lower alkyl-2-pyrrolidylmethyl phenylcyclopentylglycolate and N-lower alkyl-3-piperidyl phenylcyclopentylglycolate.

8. The process which comprises reacting N-ethyl-3-chloropiperidine with phenylcyclopentylglycolic acid under acidic reaction conditions to simultaneously form a mixture of N-ethyl-2-pyrrolidylmethyl phenylcyclopentylglycolate and N-ethyl-3-piperidyl phenylcyclopentylglycolate.

9. The process which comprises reacting an N-lower, alkyl-3-halopiperidine with benzilic acid under acidic reaction conditions to simultaneously form a mixture of N-lower alkyl-2-pyrrolidylmethyl benzilate and N-lower alkyl-3-piperidyl benzilate.

10. The process which comprises reacting N-ethyl-3-chloropiperidine with benzilic acid under acidic reaction conditions to simultaneously form a mixture of N-ethyl-2-pyrrolidylmethyl benzilate and N-ethyl-3-piperidyl benzilate.

References Cited in the file of this patent
UNITED STATES PATENTS

| | | |
|---|---|---|
| 2,695,301 | Blicke | Nov. 23, 1954 |
| 2,928,843 | Mehta | Mar. 15, 1960 |

FOREIGN PATENTS

| | | |
|---|---|---|
| 788,126 | Great Britain | Dec. 23, 1957 |

OTHER REFERENCES

Biel: J.A.C.S., vol. 77, 1955, pp. 2250–2256.
Biel: J.A.C.S., vol. 74, 1952, pp. 1485–1488.